Figure 1:
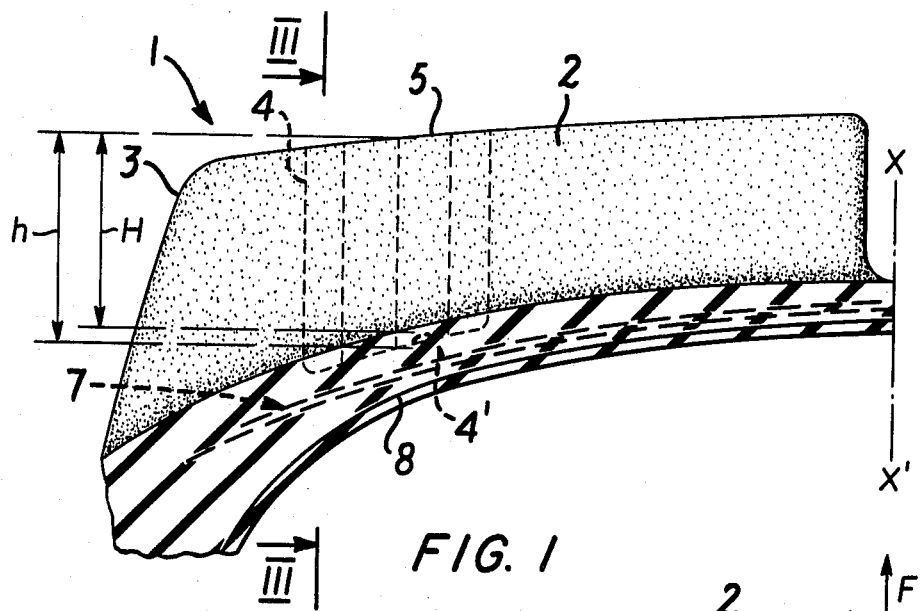

United States Patent [19]

Flechtner et al.

[11] 4,303,115
[45] Dec. 1, 1981

[54] PROCESS AND MOLD FOR SHAPING TIRE TREAD WITH BLADES TO PREVENT UNDULATIONS IN CROWN REINFORCEMENT AND PRODUCT

[75] Inventors: Charles Flechtner, Clermont-Ferrand; Yves Herbelleau, Riom; Jean Pommier, Clermont-Ferrand, all of France

[73] Assignee: Compagnie Generale des Etablissements Michelin, Clermont-Ferrand, France

[21] Appl. No.: 172,953

[22] Filed: Jul. 28, 1980

[30] Foreign Application Priority Data

Jul. 30, 1979 [FR] France .................................. 79 19759

[51] Int. Cl.³ .................... B60C 11/12; B29H 17/02
[52] U.S. Cl. .......................... 152/209 R; 156/128 R; 425/46
[58] Field of Search ........... 152/209 R, 209 D, 209 B, 152/330 R; D12/140, 151; 156/125, 128 R, 129; 264/326, 501, 502; 425/28 R, 37, 35, 46

[56] References Cited

U.S. PATENT DOCUMENTS

| D. 190,985 | 7/1961 | Blankenship et al. .......... 152/209 D |
| 3,199,567 | 8/1965 | Kunz et al. ............................ 425/46 |
| 3,974,018 | 8/1976 | Arimura et al. ..................... 156/125 |
| 4,088,523 | 5/1978 | Gallizia et al. ....................... 156/125 |
| 4,222,424 | 9/1980 | Tsuzura et al. ...................... 264/326 |

*Primary Examiner*—Michael W. Ball
*Attorney, Agent, or Firm*—Brumbaugh, Graves, Donohue & Raymond

[57] ABSTRACT

In order to prevent the edges of the crown reinforcement of radial carcass tires whose tread contains oblong elements in relief or blocks (tires for earth-moving vehicles and for drive wheels of agricultural tractors) from deforming during the vulcanization of these tires in the vulcanization mold, at least some of these oblong blocks are provided with a furrow whose depth is between ½ and 6/5 of the radial height of the oblong block in question and whose length is not greater than ⅓ of the length of the oblong block. The element in relief which, within the mold, serves to mold the furrow within the oblong block of the tread prevents the folding and/or deformation of the crown reinforcement of the tire.

3 Claims, 7 Drawing Figures

PROCESS AND MOLD FOR SHAPING TIRE TREAD WITH BLADES TO PREVENT UNDULATIONS IN CROWN REINFORCEMENT AND PRODUCT

This invention concerns tires intended to travel off the road and whose tread contains oblong elements in relief or blocks separated by recessed portions which may occupy up to about 50% of the entire surface of the tread. The invention also extends to the molds and processes for the manufacture of these tires.

French Pat. No. 1,435,804 which corresponds to U.S. Pat. No. 3,559,714 mentions that the molding of such a tread in the vulcanization mold causes deformations in the reinforcements located below said oblong elements of the tread. These deformations are greater in the marginal regions of the crown reinforcement when a tire of the type in question is provided with a carcass reinforcement of radial type capped by a crown reinforcement formed of at least two crossed plies of cables. The edges of the crown plies are free and they fold or undulate under the influence of the flow of the masses of rubber which is caused by the combined effect of the pressure of the recessed portions and of the elements in relief of the mold and of the pressure exerted by the vulcanization membrane of the chamber. These foldings or undulations reduce the life of the tires as well as their suitability for recapping.

In order to overcome this drawback, French Pat. No. 1,435,804 which corresponds to U.S. Pat. No. 3,559,714 recommends arranging, along critical zones radially to the outside of the crown reinforcement, at least one practically longitudinally oriented ply of cables of a material (for instance, a polyamide) which contracts under the effect of the vulcanization heat. The tension of the cables prevents the folding and/or undulation of the crown reinforcement. This solution is relatively expensive due to the presence of at least one additional ply of textile material which, if the crown reinforcement is of steel, cannot participate in the resistance of the latter. This solution is also complicated due to the installing of a ply of quasi-longitudinal cables.

The object of the present invention is to remedy the foldings or undulations of the crown reinforcement which are caused by the molding of the tread while avoiding the necessity of providing an additional ply, which is possibly useless for the resistance of the crown reinforcement.

Accordingly, the off-the-road tire in accordance with the invention having a radial carcass reinforcement, a crown reinforcement formed of at least two plies of wires or cables crossed from one ply to the next and a tread comprising oblong elements in relief or blocks arranged in lateral zones of the tread and inclined in the direction of their length with respect to the circumferential direction of the tire, is characterized by the fact that at least some of the oblong blocks have at least one furrow whose radially inner end or base (a) is located at a radial distance from the travel surface of the block equal to between $\frac{1}{2}$ and 6/5 of the radial height of the block, (b) has an effective width equal to between 1/10 and $\frac{1}{3}$ of the width of the block, and (c) extends below the perimeter of the block in the direction of the length thereof over an effective length at most equal to $\frac{1}{3}$ of the length of the block and below the axially outer half of the perimeter.

By convention an oblong block is a block whose surface at the level of the tread is called the travel surface and has a contour which can be inscribed within a rectangle; the length of this rectangle defines the length of the oblong block, and its width the width of said block;

the inclination of the oblong block to the circumferential direction of the tire is the inclination of the longest side of the said rectangle to the circumferential direction of the tire;

The radial height of the oblong block (with respect to which the radial distance from the radially inner end or base of the furrow in accordance with the invention is defined) is the radial distance from the travel surface of said oblong block, measured at the level of the furrow, to the bottom of the deepest groove, that is to say the one closest to the tire reinforcement, which delimits the oblong block in question;

the effective width of the radially inner end or base of the furrow is the width of the rectangle within which the contour (or the trace in the case of an incision) of the radially inner end or base of the furrow is inscribed;

the effective length of the radially inner end or base of the furrow is the length of the rectangle within which the contour or trace of said end or base is inscribed.

The mold intended to manufacture the tire of the invention comprises a corresponding number of oblong recessed parts intended to mold the oblong blocks of the tread provided with the furrows, the recessed parts of the mold being in their turn provided with elements in relief (blades) corresponding to the furrows of the oblong blocks of the tread.

The elements in relief (blades) which are arranged in the oblong recessed parts of the mold, by reason, on the one hand, of the area (effective width multiplied by effective length) which their free ends present and, on the other hand, the distance from these free ends to the travel surface of the oblong block of the tread, oppose in depth, at the time of the molding of the tread, the flow of the rubber which generates folding and/or undulations of the crown reinforcement and, more particularly, of the radially outer crown ply.

As a result, it is immaterial, within the scope of the invention, whether the furrows debouch on the travel surface or on a sidewall of the oblong blocks.

The means in accordance with the invention are of maximum effectiveness when the oblong blocks with their furrows are arranged in or extend into the marginal zones of the tread, that is to say radially above the marginal zones of the crown plies, which are the most readily subject to form the folds and/or undulations indicated above.

The accompanying drawing and the following description referring thereto are intended to illustrate and describe a number of embodiments of the present invention.

Figure 2:
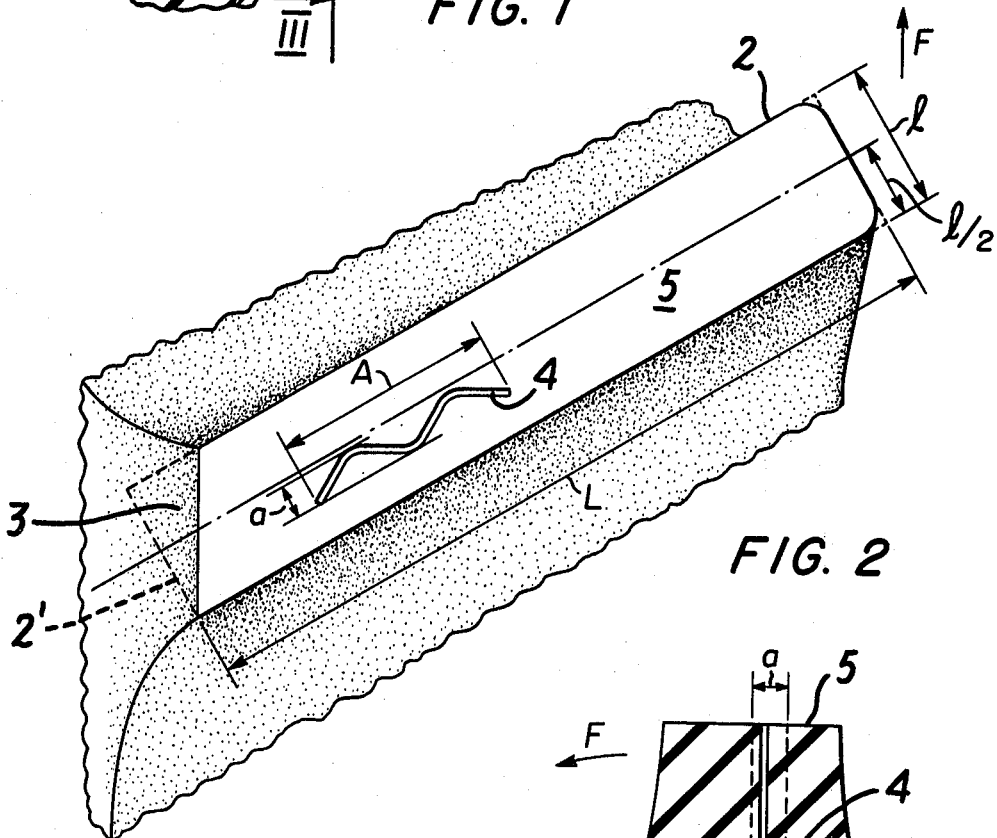
Figure 3:
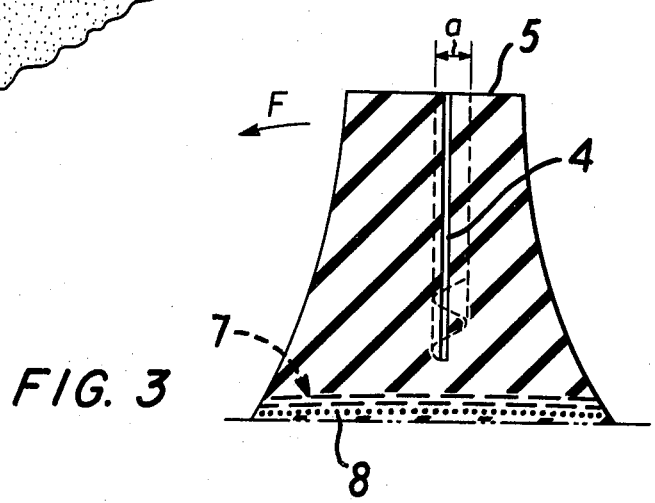
Figure 4:
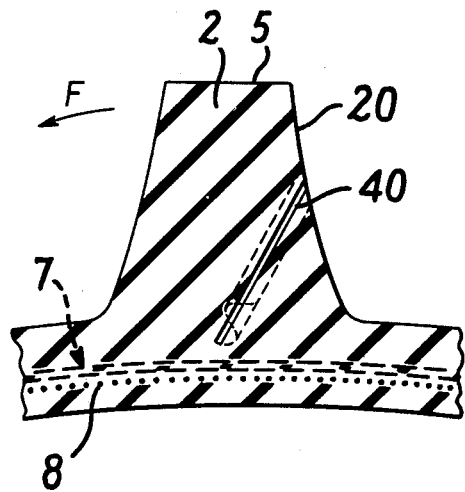
Figure 6:
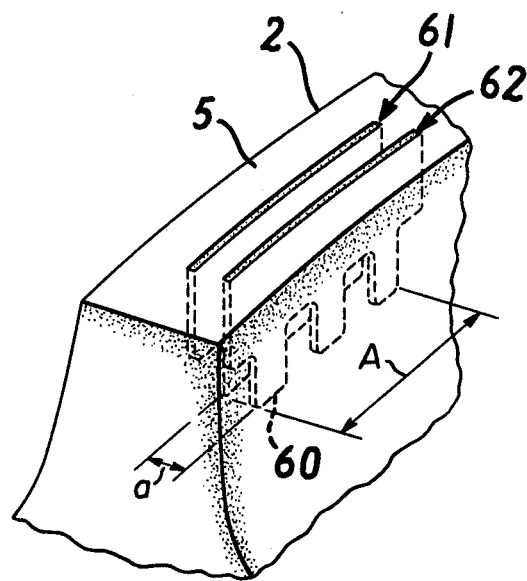
Figure 5:
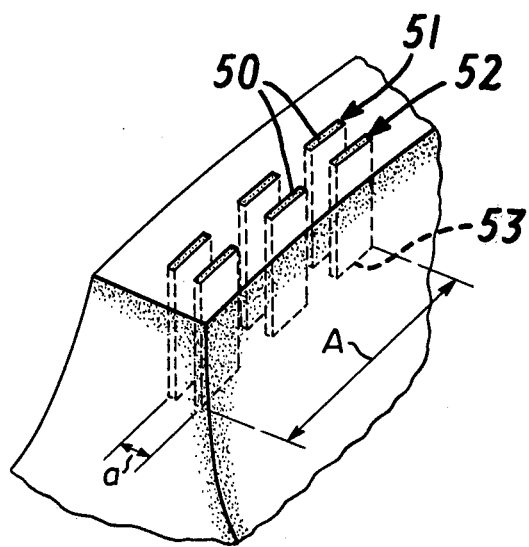
Figure 7:
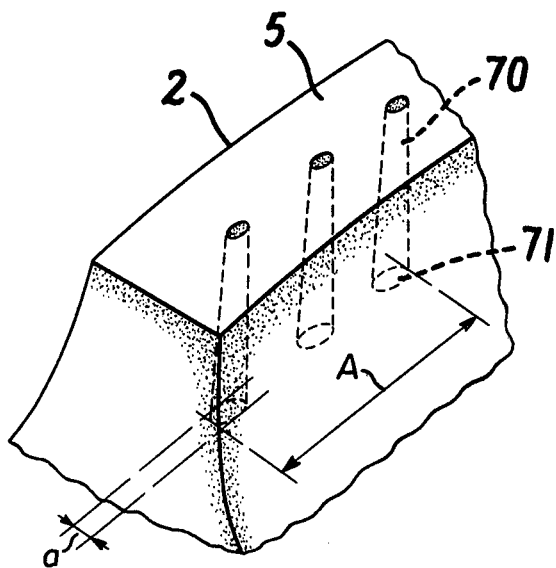

In the drawing:

FIG. 1 is a view in radial section of one-half of a tire having an oblong element in relief or block, seen here in elevation, FIG. 2 is a view in perspective, from above, of the oblong relief element of FIG. 1, FIG. 3 is a cross-sectional view of the same oblong relief element along the section line III—III of FIG. 1, FIG. 4 is a view similar to FIG. 3 but showing a furrow which debouches on a sidewall of an oblong relief element, and FIGS. 5 to 7 are views in perspective, from above, of the side portion of oblong relief elements or blocks in which furrows designed in accordance with other embodiments of the invention are provided.

In FIGS. 1 to 3 there is shown a portion of the tread 1 of a tire for an agricultural vehicle, comprising an oblong block 2. The latter extends approximately from the edge 3 of the tread 1 up to the vicinity of the equatorial plane of the tire, the trace of which plane is indicated by the line XX' in FIG. 1. This oblong block 2 is inscribed within a rectangle 2' (FIG. 2) of length L and width 1 shown in dashed line in FIG. 2. Contrary to what is shown in FIG. 2, the block 2 may have any shape whatsoever, for instance curved, with an oblong portion.

In FIG. 1, the furrow 4 provided in the section of the block 2 which is adjacent to the edge 3 of the tread 1 extends in radial direction from the travel surface 5 to a radial distance h which is greater than the radial height H of the block 2. The base 4' of this furrow 4 is here a few millimeters from the cable plies which form part of the crown reinforcement 7 which surrounds the radial carcass reinforcement 8. In this example, the furrow 4 is formed of an incision along an undulated line (See FIG. 2), the effective width "a" of which, measured at the base, is equal to the peak-to-peak amplitude of this undulated trace. The effective length of this furrow, measured at the base, is designated by the letter A.

This furrow 4 debouches on the travel surface 5 of the block 2; it is preferable for it to debouch on the rear half 1/2 of the travel surface 5 of the block 2, that is to say on the trailing half thereof with respect to the direction of travel of the tire, indicated by the arrow F in FIGS. 2, 3 and 4.

In the variant embodiment shown in FIG. 4, the furrow 40 debouches in the rear sidewall 20 of the block 2.

In the variant embodiment shown in FIG. 5, the furrow consists of an assembly of incisions 50 isolated from each other and arranged in two approximately parallel rows 51, 52. The effective width "a" of this assembly of isolated incisions 50 is measured at the base 53 of the incisions, as is its effective length A.

In the embodiment shown in FIG. 6, which is derived from the embodiment of FIG. 5, the incisions 60 of each row are connected together at the level of the travel surface 5 of the block 2, and thus at this level form a single incision 61 or 62. This arrangement facilitates and strengthens the implantation in the mold of the relief element (blade) intended to mold the furrow. The effective dimensions "a" and A of the furrow in this embodiment are measured in the same manner as in the embodiments prescribed with reference to FIGS. 1 to 5.

In the variant embodiment of the invention shown in FIG. 7, the furrow is composed of three radial chimneys 70 which debouch on the travel surface 5 of the block 2. The section of these chimneys is circular in this embodiment, with a base diameter "a" which is larger than at the level of the travel surface 5. This diameter represents the effective width of the furrow. The effective length A is measured at the base 71 of the chimneys 70.

The invention is not limited to the embodiments prescribed above, since it is obvious that numerous variations may be devised within the scope defined by the claim set forth below.

Although the oblong relief element consists of a single block in the above description, such element could be composed of a plurality of blocks spaced at a greater or lesser distance from each other in the direction of their length.

What is claimed is:

1. A method of manufacturing an off-the-road tire having a radial carcass reinforcement, a crown reinforcement formed of at least two plies with free edges of wires or cables crossed from one ply to the next and a tread comprising oblong elements in relief or blocks arranged in the lateral zones of the tread and inclined in the direction of their length with respect to the circumferential direction of the tire, characterized by molding and vulcanizing the tire in a vulcanization mold having oblong recessed parts to mold the oblong elements in relief or blocks of the tread of the tire, the oblong recessed part of the vulcanization mold being provided with elements in relief or blades for forming corresponding furrows in the oblong elements in relief or blocks of the tread of the tire, the radially outer or free end of said elements in relief or blades,
   (a) being located at a radial distance from the travel surface of the oblong block which is equal to between ½ and 6/5 of the radial height of the oblong block,
   (b) having an effective width which is equal to between 1/10 and ⅓ of the width of the oblong block, and
   (c) extending below the perimeter of the oblong block in the direction of the length thereof over an effective length at most equal to ⅓ of the length of the oblong block and below the axially outer half of the perimeter,
whereby foldings or undulations of the free edges of the plies of the crown reinforcement during molding and vulcanizing of the tire and prevented.

2. A vulcanization mold for use in the method according to claim 1 having oblong recessed parts to mold the oblong elements in relief or blocks of the tread of the tire, the oblong recessed parts of the vulcanization mold being provided with elements in relief or blades for forming corresponding furrows in the oblong elements in relief or blocks of the tread of the tire, the radially outer or free end of said elements in relief or blades,
   (a) being located at a radial distance from the travel surface of the oblong block which is equal to between ½ and 6/5 of the radial height of the oblong block,
   (b) having an effective width which is equal to between 1/10 and ⅓ of the width of the oblong block, and
   (c) extending below the perimeter of the oblong block in the direction of the length thereof over an effective length at most equal to ⅓ of the length of the oblong block and below the axially outer half of the perimeter.

3. An off-the-road tire produced by the method according to claim 1.

* * * * *

UNITED STATES PATENT AND TRADEMARK OFFICE
CERTIFICATE OF CORRECTION

PATENT NO. : 4,303,115

DATED : Dec. 1, 1981

INVENTOR(S) : Flechtner et al.

It is certified that error appears in the above—identified patent and that said Letters Patent is hereby corrected as shown below:

Col. 4, line 22, "part" should read --parts--.

Signed and Sealed this

Thirteenth Day of April 1982

[SEAL]

Attest:

GERALD J. MOSSINGHOFF

Attesting Officer

Commissioner of Patents and Trademarks